Patented Oct. 30, 1951

2,573,294

UNITED STATES PATENT OFFICE 2,573,294

METHOD OF STABILIZING HYDROCARBONS AND REAGENTS THEREFOR

Joseph Ackerman, Jr., and Charles W. Moberly, Bartlesville, Okla., assignors to Phillips Petroleum Company, a corporation of Delaware No Drawing. Application June 2, 1947,
Serial No. 752,002

22 Claims. (Cl. 202—57)

This invention relates to novel compositions for the stabilization of organic materials. One embodiment of this invention relates to the stabilization of organic materials by use of reaction products of high molecular weight fatty acid salts of polyvalent metals in the lower state of oxidation with phenolic type materials. In one specific embodiment it relates to the stabilization of hydrocarbon materials against deterioration due to oxidation by use of the reaction product of stannous stearate and alpha naphthol. In another specific embodiment it relates to stabilization of a completely saturated liquid hydrocarbon material containing a high proportion of isoparaffin hydrocarbons.

It is common knowledge that many hydrocarbon materials deteriorate when oxygen is present with the formation of gummy materials and oxygenated derivatives and in some instances with the development of objectionable odor and color. These deteriorative processes are common particularly in those instances in which distillation or heating in the presence of air is a step in preparing the hydrocarbon product and/or where very reactive hydrocarbons are present in the finished product. Inhibitors have been used heretofore with varying degrees of success; however, in many instances upon heating the hydrocarbon material, odor and color development have been pronounced. Also, during storage the hydrocarbon tends to decompose or become oxygenated. In some cases the inhibitive agents themselves impart odor and color to the hydrocarbon or decompose upon heating thus rendering the hydrocarbon useless for certain purposes.

We have now found that such deterioration in hydrocarbon materials as manifested by odor and color development, gummy residues, formation of oxygenated substances and the like can be eliminated or substantially reduced by incorporating from about 0.005 to about 0.5 per cent by weight of the reaction product of stannous stearate and alpha naphthol, believed to be stannous stearate-naphtholate and/or stannous di-naphtholate. Whatever the reaction product or products may be, they are outstanding in effecting the stabilization of otherwise unstable hydrocarbons; however, other compounds of polyvalent metals in a lower state of oxidation and naphtholic and phenolic materials are useful for this purpose. These are described below. We have also found that heating and/or distillation of the said hydrocarbons can be effected in the presence of these inhibitors with the production of odor free materials valuable for many potential uses. In addition, we have found that liquid hydrocarbon materials which are completely saturated but which contain a high proportion of isoparaffin hydrocarbons tend to develop undesired odor during storage and that such odor development in these saturated materials can be inhibited by the addition of these reaction products.

One object of this invention is to provide novel compositions for the stabilization of organic materials.

Another object of this invention is to provide a method for the stabilization of organic materials against deterioration by oxidation.

Still another object is to provide a method to prevent the deterioration of a normally liquid hydrocarbon material against deterioration as evidenced by development of objectionable odor and color and the formation of gummy residue and the like.

Still another object of this invention is to provide novel oxidation inhibitors by reacting high molecular weight fatty acid salts of polyvalent metals in the lower state of oxidation with phenolic type materials.

A specific object is to stabilize normally liquid saturated hydrocarbon materials which contain isoparaffins against deterioration during preparation, storage and use by incorporating therein small amounts of the reaction product of stannous stearate and alpha naphthol.

Other objects and advantages of this invention will be apparent to those skilled in the art from the accompanying discussion and description.

The new and effective compositions of our invention are prepared by the interaction of a salt of a polyvalent metal in its lower state of oxidation selected from the group consisting of stannous, chromous, cobaltous, cuprous, and ferrous salts of high molecular weight fatty acids, particularly those containing not more than one unsaturated linkage to the molecule, such as the stearates, palmitates, oleates, and the like and a phenolic type material. The fatty acid salts are preferred inasmuch as the liberated acid of the reaction is sufficiently weak that it does not induce hydrolysis of the stabilizing agent. The phenolic type reactants comprise phenol, polyhydroxy phenols such as catechol, resorcinol, hydroquinone, and pyrogallol, ortho, meta, and para cresol, xylenols, amino phenols and other substituted phenols, alpha- and beta-naphthol, alkyl naphthols and dihydroxy naphthols, and similar compounds which have a hydroxyl group or groups attached to an aromatic ring.

In a general embodiment, the method of preparing the reagents of our invention comprises reacting the selected metal salt with the phenolic compound at temperatures ranging from about 100 to about 300° F. for a period of time ranging from about 30 minutes to about 2 hours, depending upon the particular reactants employed. The molecular ratio of the metal salt to the phenolic compound may vary from 1:1 to 1:2. This also depends upon the specific reactants employed.

The resulting product may then be washed with a suitable solvent, alcohol for example, and the alcohol insoluble portion separated and used as the novel stabilizing agent for organic materials, more specifically for hydrocarbon materials. This product may be incorporated before or during distillation of the hydrocarbon materials by addition to the kettle and also during storage after distillation. The quantity of our stabilizing agent necessary to prevent or substantially reduce deterioration is small and it does not decompose or impart color or odor characteristics to hydrocarbon materials; therefore its presence is not detrimental to the further processing and use of the hydrocarbon material. As the stabilization product is soluble in hydrocarbon materials, any convenient manner may be used to incorporate the product in the hydrocarbon materials.

While we prefer to prepare our compositions by the method described, these reagents may be formed in situ by refluxing the reactants with the hydrocarbon material to be stabilized. This procedure may be used when in the preparation or distillation of the hydrocarbon material, the temperature is sufficiently high and the time of heating is long enough to effect the formation of the inhibitor. However, when the stabilizer is added to the hydrocarbon for preservation during storage, or the hydrocarbons are low boiling materials, the preformed reagent is necessary for the effective stabilization desired.

While the use of high molecular weight fatty acid salts of stannous tin as stabilizing agents has been disclosed previously, and the use of certain phenolic compounds such as alpha-naphthol or amino phenols are also known, the present invention is concerned with new compositions and to their superior effect as stabilizing agents. The effect is far in excess to that of the reactants alone or in unreacted combination. This fact is also indicated when hydrocarbon materials containing our novel compositions are compared to those containing well-known antioxidants. That new compounds are formed which are highly suitable for the prevention of deterioration or oxidation of organic materials, particularly normally liquid hydrocarbons, is the essence of this invention.

The present invention is applicable in the preparation, storage, and use of hydrocarbon materials which are substantially water-white and odor-free. Such materials are valuable as solvents for dry cleaning, household insecticide bases, paint and varnish thinners, and the like. A readily available source of fractions which are completely saturated boiling in the preferred range for such solvents would appear to lie in the alkylate produced by the interaction of low-boiling isoparaffins with short chain olefins, some fractions of which are used in the motor fuel industry. However, these and other materials which are otherwise suitable tend to deteriorate during distillation and storage and in such cases this deterioration limits the usefulness of the hydrocarbon considerably. By reacting the compounds according to the method of our invention, new compositions are prepared which are stable and odor-free and which stabilize organic materials in storage and in use over long periods of time.

While the stabilization of normally liquid hydrocarbons is particularly of concern in the present invention, the use of these novel compositions in the prevention of deterioration and/or oxidation of other organic materials and in the prevention of the formation of gummy materials or in the polymerization of unsaturated compounds is within the scope of the disclosure.

*Example I*

A composition was prepared by heating alpha-naphthol and stannous stearate in approximately equimolecular quantities for a period of two hours at a temperature of 210° F. The reaction mixture was extracted with ethyl alcohol and the alcohol-insoluble composition which was a white powder was used as the stabilizing agent. This composition was added in the amount of 0.01 per cent by weight to a highly paraffinic hydrocarbon fraction having a boiling range of 365 to 402° F. The resulting hydrocarbon material was refluxed for 56 hours with no color or odor development or other signs of deterioration. The peroxide content was 0.

*Example II*

For the purpose of comparing the stabilizing effectiveness of the composition as prepared in Example I with other stabilizers a series of eight flasks equipped with reflux condensers were charged with a highly paraffinic hydrocarbon fraction having a boiling range of 365 to 402° F. To the first of these was added alpha-naphthol alone; to the second, stannous stearate alone; to the third, equal amounts of stannous stearate and alpha-naphthol; to the fourth, the alcohol-insoluble composition as prepared in Example I; to the fifth, isobutyl para-aminophenol; to the sixth, lecithin; to the seventh, alpha-naphthylamine; to the eighth, pyrogallol. Flasks 5, 6, 7 and 8 contained 0.001 per cent of alpha-naphthol in addition to the inhibitor named. The following table is self-explanatory and contains the results which were obtained upon refluxing the contents of the various flasks.

| Flask | Inhibitor | Per Cent by Weight in Hydrocarbon | Time of Reflux | Undesirable Odor After Reflux | Peroxide Content [1] After Reflux, Parts per Million | Remarks |
|---|---|---|---|---|---|---|
| 1 | Alpha-Naphthol | 0.01 | 17 hrs | strong | 3 | yellow color. |
| 2 | Stannous stearate | 0.01 | 2 hrs | do | 45 | |
| 3 | Stannous stearate and alpha-naphthol | {0.005/0.005} 0.01 | | | 0 | |
| 4 | Alcohol, insoluble composition | 0.01 | 56 hrs | do | 0 | |
| 5 | Isobutyl para-aminophenol | 0.01 | 15 min | strong | 177 | |
| 6 | Lecithin | 0.01 | 15 min | do | 11 | odor due to decomposition of inhibitor. |
| 7 | Alpha-naphthol-amine | 0.01 | 15 min | | 36 | |
| 8 | Pyrogallol | 0.01 | 15 min | do | 29 | |

[1] Parts per million as determined by the Ferrous Thiocyanate Method (U. O. P.—H—33).

We claim:

1. A method for stabilizing hydrocarbon material against deterioration, which comprises incorporating in such hydrocarbon material a small portion of the reaction product obtained by the interaction of a phenolic material and a salt of a high molecular weight fatty acid having at least 16 carbon atoms per molecule in which the cation of said salt is selected from the group consisting of stannous, chromous, cobaltous, cuprous and ferrous ions.

2. A method for stabilizing hydrocarbon material against deterioration, which comprises incorporating in such hydrocarbon material from 0.005 to 0.50 per cent by weight of a reaction product obtained by the interaction of a phenolic material and a salt of a high molecular weight fatty acid having at least 16 carbon atoms per molecule in which the cation of said salt is selected from the group consisting of stannous, chromous, cobaltous, cuprous and ferrous ions.

3. A method for stabilizing hydrocarbon material against deterioration caused by oxidation, which comprises incorporating in such hydrocarbon material from 0.008 to 0.05 per cent by weight of the reaction product obtained by the interaction of a phenolic material and a salt of a high molecular weight fatty acid having at least 16 carbon atoms per molecule in which the cation of said salt is selected from the group consisting of stannous, chromous, cobaltous, cuprous and ferrous ions.

4. A method for stabilizing hydrocarbon material against deterioration, which comprises incorporating in such hydrocarbon material a small portion of the reaction product obtained by the interaction of a phenolic material and a salt of a high molecular weight saturated fatty acid having at least 16 carbon atoms per molecule in which the cation of said salt is selected from the group consisting of stannous, chromous, cobaltous, cuprous and ferrous ions.

5. A method for stabilizing hydrocarbon material against deterioration, which comprises incorporating in such hydrocarbon material from 0.005 to 0.50 per cent by weight of a reaction product obtained by the interaction of a phenolic material and a salt of a high molecular weight saturated fatty acid having at least 16 carbon atoms per molecule in which the cation of said salt is selected from the group consisting of stannous, chromous, cobaltous, cuprous and ferrous ions.

6. A method for stabilizing hydrocarbon material against deterioration caused by oxidation, which comprises incorporating in such hydrocarbon material from 0.008 to 0.05 per cent by weight of the reaction product obtained by the interaction of a phenolic material and a salt of a high molecular weight saturated fatty acid having at least 16 carbon atoms per molecule in which the cation of said salt is selected from the group consisting of stannous, chromous, cobaltous, cuprous and ferrous ions.

7. A method for stabilizing hydrocarbon material against deterioration, which comprises incorporating in such hydrocarbon material a small portion of the reaction product obtained by the interaction of a phenolic material and a salt of a high molecular weight fatty acid having one carbon to carbon unsaturated linkage and at least 18 carbon atoms per molecule in which the cation of said salt is selected from the group consisting of stannous, chromous, cobaltous, cuprous and ferrous ions.

8. A method for stabilizing hydrocarbon material against deterioration, which comprises incorporating in such hydrocarbon material from 0.005 to 0.50 per cent by weight of a reaction product obtained by the interaction of a phenolic material and a salt of a high molecular weight fatty acid having one carbon to carbon unsaturated linkage and at least 18 carbon atoms per molecule in which the cation of said salt is selected from the group consisting of stannous, chromous, cobaltous, cuprous and ferrous ions.

9. A method for stabilizing hydrocarbon material against deterioration caused by oxidation, which comprises incorporating in such hydrocarbon material from 0.008 to 0.05 per cent by weight of the reaction product obtained by the interaction of a phenolic material and a salt of a high molecular weight fatty acid having one carbon to carbon unsaturated linkage and at least 18 carbon atoms per molecule in which the cation of said salt is selected from the group consisting of stannous, chromous, cobaltous, cuprous and ferrous ions.

10. A process for stabilizing hydrocarbon materials against deterioration caused by oxidation, which comprises incorporating therein a small amount of a reaction product obtained by the interaction of alpha-naphthol and a salt of stearic, palmitic and oleic acids in which the cation of said salt is selected from the group consisting of stannous, chromous, cobaltous, cuprous and ferrous ions.

11. The process of claim 10 wherein the amount of reaction product incorporated in hydrocarbon material is from 0.005 to 0.50 weight per cent.

12. A method for stabilizing highly paraffinic hydrocarbon materials against deterioration caused by oxidation, which comprises incorporating in such highly paraffinic hydrocarbon materials a small portion of the reaction product obtained by the interaction of stannous stearate and a naphthol.

13. A method for stabilizing highly paraffinic hydrocarbon materials against deterioration caused by oxidation, which comprises incorporating in such highly paraffinic hydrocarbon materials from 0.005 to 0.50 weight per cent of the reaction product obtained by the interaction of stannous stearate and alpha-naphthol.

14. A method for stabilizing highly paraffinic hydrocarbon materials against deterioration caused by oxidation, which comprises incorporating in such highly paraffinic hydrocarbon materials from 0.008 to 0.05 weight per cent of the reaction product obtained by the interaction of stannous stearate and alpha-naphthol.

15. A method for stabilizing a paraffinic hydrocarbon material against deterioration due to oxidation, which comprises adding a salt of high molecular weight fatty acids having not more than one carbon to carbon unsaturated linkage and at least 16 carbon atoms per molecule in which the cation of said salt is selected from the group consisting of stannous, chromous, cobaltous, cuprous and ferrous ions and a phenolic material to a paraffinic hydrocarbon material contained in a distillation zone prior to distillation of said hydrocarbon material, conducting said distillation at a temperature sufficiently high to cause said salt and said phenolic material to interact with each other forming a stabilizing agent in said distillation zone.

16. A method for stabilizing a paraffinic hydrocarbon material against deterioration caused by oxidation, which comprises incorporating in a paraffinic hydrocarbon material produced by alkylation of a low-boiling isoparaffin with a short-chain olefin from 0.005 to 0.50 weight per cent of the reaction product obtained by the interaction of a phenolic material and a salt of stearic, palmitic and oleic acids in which the cation of said salt is selected from the group consisting of stannous, chromous, cobaltous, cuprous and ferrous ions.

17. A method for stabilizing a paraffinic hydrocarbon material against deterioration caused by oxidation, which comprises incorporating in said paraffinic material from 0.005 to 0.50 weight per cent of the reaction product obtained by the interaction of a salt of stearic, palmitic and oleic acids in which the cation of said salt is selected from the group consisting of stannous, chromous, cobaltous, cuprous and ferrous ions and a phenolic material, in a mol ratio of from 1:1 to 1:2, at a temperature in the range of from 100 to 300° F. for a period of time ranging of from 30 minutes to two hours.

18. A stabilizing agent for hydrocarbon material prepared by the interaction of a phenolic material and a salt of a high molecular weight fatty acid having at least 16 carbon atoms per molecule in which the cation of said salt is selected from the group consisting of stannous, chromous, cobaltous, cuprous and ferrous ions, in a mol ratio of from 2:1 to 1:1, at a temperature of from 100° F. to 300° F. and for a period of time of from 30 minutes to 2 hours.

19. A stabilizing agent for hydrocarbon material prepared by the interaction of a phenolic material and a salt of a high molecular weight saturated fatty acid having at least 16 carbon atoms per molecule in which the cation of said salt is selected from the group consisting of stannous, chromous, cobaltous, cuprous and ferrous ions, in a mol ratio of from 2:1 to 1:1, at a temperature of from 100° F. to 300° F. and for a period of time of from 30 minutes to 2 hours.

20. A stabilizing agent for hydrocarbon material prepared by the interaction of a phenolic material and a salt of a high molecular weight fatty acid having one carbon to carbon unsaturated linkage and at least 18 carbon atoms per molecule in which the cation of said salt is selected from the group consisting of stannous, chromous, cobaltous, cuprous and ferrous ions, in a mol ratio of from 2:1 to 1:1, a temperature of from 100° F. to 300° F. and for a period of time of from 30 minutes to 2 hours.

21. A stabilizing agent for hydrocarbon material prepared by the interaction of alpha-naphthol and a salt of stearic, palmitic and oleic acids in which the cation of said salt is selected from the group consisting of stannous, chromous, cobaltous, cuprous and ferrous ions.

22. A stabilizing agent for stabilizing a paraffinic hydrocarbon material against deterioration caused by oxidation, prepared by the interaction of stannous stearate and a naphthol.

JOSEPH ACKERMAN, Jr.
CHARLES W. MOBERLY.

REFERENCES CITED

The following references are of record in the file of this patent:

UNITED STATES PATENTS

| Number | Name | Date |
|---|---|---|
| 2,295,773 | Chenicek | Sept. 15, 1942 |
| 2,388,041 | Craig | Oct. 30, 1945 |
| 2,422,566 | Proell | June 17, 1947 |
| 2,426,709 | Roddy | Sept. 2, 1947 |
| 2,445,367 | Robey et al. | July 20, 1948 |
| 2,526,963 | Morris | Oct. 24, 1950 |